(12) United States Patent
Hooper, Jr. et al.

(10) Patent No.: US 10,370,893 B2
(45) Date of Patent: Aug. 6, 2019

(54) APPARATUS AND METHOD FOR ASSEMBLY OF STRUCTURAL PROFILES AND RESULTANT STRUCTURES

(71) Applicant: ARCONIC INC., Pittsburgh, PA (US)

(72) Inventors: William J. Hooper, Jr., Lawrenceville, GA (US); Ion-Horatiu Barbulescu, Atlanta, GA (US)

(73) Assignee: Arconic Inc., Pittsburgh, PA (US)

( * ) Notice: Subject to any disclaimer, the term of this patent is extended or adjusted under 35 U.S.C. 154(b) by 0 days.

(21) Appl. No.: 15/705,958

(22) Filed: Sep. 15, 2017

(65) Prior Publication Data
US 2019/0085617 A1 Mar. 21, 2019

(51) Int. Cl.
*E06B 3/263* (2006.01)
*E06B 1/32* (2006.01)
(Continued)

(52) U.S. Cl.
CPC ............ *E06B 3/26303* (2013.01); *E06B 1/18* (2013.01); *E06B 1/30* (2013.01); *E06B 1/325* (2013.01); *E06B 3/26* (2013.01); *E06B 3/267* (2013.01); *B29C 44/12* (2013.01); *B29C 44/34* (2013.01); *B29C 70/745* (2013.01); *E06B 2003/26312* (2013.01); *E06B 2003/26321* (2013.01); *E06B 2003/26352* (2013.01); *E06B 2003/26354* (2013.01); *E06B 2003/26378* (2013.01); *E06B 2003/26389* (2013.01)

(58) Field of Classification Search
CPC . E06B 2003/26389; E06B 2003/26321; E06B 3/26303; E06B 1/325; E06B 3/267; E06B 1/30; E06B 1/18; E06B 3/26; E06B 2003/26354
See application file for complete search history.

(56) References Cited

U.S. PATENT DOCUMENTS 3,093,217 A 6/1963 Doede
3,204,324 A 9/1965 Fridthjov
(Continued)

FOREIGN PATENT DOCUMENTS

CN 206468185 U 9/2017
DE 2625533 12/1977
(Continued)

OTHER PUBLICATIONS

International Search Report and Written Opinion dated Jan. 9, 2019, issued by the Korean Intellectual Property Ofice in application No. PCT/US2018/050328 (17 pages).

*Primary Examiner* — Andrew J Triggs
(74) *Attorney, Agent, or Firm* — Greenberg Traurig, LLP

(57) ABSTRACT

A composite structure has a pair of parallel aluminum extrusions bridged by a polymer cap and defining a U-shape hollow. The hollow is filled with an expandable foam that adheres to and mechanically interdigitates with the extrusions, which have channels for receiving insertion legs of the extrusions and have extensions, which the foam encapsulates. End caps may be used to further delimit the hollow. The caps and the foam have a thermal conductivity less than that of the extrusions, providing a thermal break. An upper cap may be used and may incorporate features to compensate for the foam expansion. Excess foam may be trimmed. A forked tool may be used to hold the extrusions during joining.

15 Claims, 21 Drawing Sheets

(51) Int. Cl.
  *E06B 3/267* (2006.01)
  *E06B 1/30* (2006.01)
  *E06B 1/18* (2006.01)
  *E06B 3/26* (2006.01)
  *B29C 70/74* (2006.01)
  *B29C 44/12* (2006.01)
  *B29C 44/34* (2006.01)

(56) References Cited

U.S. PATENT DOCUMENTS

| | | | |
|---|---|---|---|
| 3,885,371 A | 5/1975 | Oakes | |
| 3,925,953 A * | 12/1975 | LaBorde | E06B 3/26307 |
| | | | 49/DIG. 1 |
| 4,275,526 A | 6/1981 | Abramson | |
| 4,330,919 A | 5/1982 | Bischlipp et al. | |
| 4,342,144 A | 8/1982 | Doguchi | |
| 4,420,919 A | 12/1983 | Weber | |
| 4,495,726 A | 1/1985 | Lindstrom | |
| 4,524,112 A | 6/1985 | Willert | |
| 4,589,240 A | 5/1986 | Kendall et al. | |
| 4,614,062 A | 9/1986 | Sperr | |
| 4,786,539 A * | 11/1988 | Grether | E06B 3/26307 |
| | | | 428/68 |
| 4,875,316 A | 10/1989 | Johnston | |
| 5,187,867 A | 2/1993 | Rawlings | |
| 6,202,353 B1 * | 3/2001 | Giacomelli | E06B 3/2632 |
| | | | 49/504 |
| 6,430,889 B1 | 8/2002 | Nixon et al. | |
| 6,655,766 B2 * | 12/2003 | Hodges | F25D 23/085 |
| | | | 312/406.2 |
| 7,096,640 B1 * | 8/2006 | Chevian | E06B 3/2675 |
| | | | 52/204.591 |
| 7,694,472 B2 * | 4/2010 | Rawlings | E06B 3/2675 |
| | | | 52/204.1 |
| 7,841,139 B2 * | 11/2010 | Dampierre | E06B 3/273 |
| | | | 52/204.1 |
| 7,845,125 B2 * | 12/2010 | Lambertini | E06B 3/26347 |
| | | | 49/428 |
| 7,874,106 B2 * | 1/2011 | Pangburn | E06B 1/68 |
| | | | 29/464 |
| 8,051,622 B2 * | 11/2011 | Dampierre | E06B 3/273 |
| | | | 52/204.63 |
| 8,096,088 B2 * | 1/2012 | Poirier | E06B 1/68 |
| | | | 52/204.5 |
| 8,322,090 B2 * | 12/2012 | Moriya | E06B 7/10 |
| | | | 52/204.591 |
| 8,510,996 B2 * | 8/2013 | Foster | E06B 5/164 |
| | | | 49/489.1 |
| 9,441,412 B1 * | 9/2016 | Hooper, Jr. | E06B 3/263 |
| 9,574,342 B2 * | 2/2017 | Clark | E04B 1/78 |
| 9,874,053 B2 * | 1/2018 | Clark | E06B 3/26305 |
| 9,920,568 B2 * | 3/2018 | Rethmeier | E06B 3/26303 |
| 2013/0247486 A1 | 9/2013 | Rawlings | |
| 2014/0053488 A1 * | 2/2014 | Lenox | E06B 3/26303 |
| | | | 52/404.1 |

FOREIGN PATENT DOCUMENTS

| | | |
|---|---|---|
| EP | 2467554 B1 | 9/2013 |
| JP | WO2016-068305 A1 | 8/2017 |
| WO | 2016-098967 A1 | 6/2016 |
| WO | 2018/107002 A1 | 6/2018 |

* cited by examiner

# APPARATUS AND METHOD FOR ASSEMBLY OF STRUCTURAL PROFILES AND RESULTANT STRUCTURES

FIELD

The present disclosure relates to architectural structures, such as windows, doors and frames, and more particularly, to apparatus and methods for making composite structures made from a plurality of parts, such as extrusions of aluminum metal or plastic, the structures displaying thermal properties pertaining to the rate of energy transfer through the composite structure.

BACKGROUND

Windows, doors, skylights and structural components made from materials such as aluminum, alloys thereof, steel and plastics are known. For example, window and door assemblies may be made from aluminum alloy extrusions. Windows manufactured with an aluminum frame with thermal break components are also known. For example, manufacturers use pour-and-debridge and crimped polyamide strips to make aluminum windows with thermal breaks. The pour-and-debridge type window uses liquid polyurethane poured in the pocket of an aluminum extrusion having a pair of tubular shapes (Exterior and Interior). The urethane is poured onto an aluminum bridge that connects the tubular shapes. After the polyurethane solidifies (cures to a solid state), the aluminum backing of the pocket (the bridge that constitutes a thermal bridge) is cut away, leaving only the hardened urethane as the connection between the now separated portions of the aluminum extrusion. Upon installation of the resultant structure, e.g., in a window opening in the wall of a building, a first part of the extrusion (on one side of the thermal break) is positioned facing the outside environment and the second part of the aluminum extrusion (on the other side of the thermal break) is positioned facing the inside environment of the building. The pour-and-debridge process involves four different operations: polyurethane mixing, lancing the aluminum extrusion, abrasion conditioning of the aluminum extrusion and cutting the backing of the thermal break. This approach also provides limited thermal break depth, which limits the thermal performance of the structure in that the deeper the thermal break, the better the thermal performance of the frame. In addition, the color of the frame is limited in that the structure typically displays a single color, i.e., the color of the entire extrusion that is subsequently debridged. This implies that the Exterior and Interior are the same color.

The crimped polyamide method uses one or more extruded polyamide (or other polymer) strips that are crimped in position between the interior and exterior extrusions of a structure, e.g., a window frame. In this case, the manufacturing process requires three different operations: knurling the aluminum extrusions, inserting the polyamide strip between the extrusions and crimping the aluminum extrusions. The shear strength of the resultant crimped structure is limited, as is the thermal performance. In addition, the polyamide strips typically used are expensive, as are the dies that are used to extrude them.

Windows that use pour-and-debridge thermal breaks may have a general U factor of about 0.5 Btu/h-ft$^2$-F and windows that use crimped polyamide may have a general U factor of about 0.3 Btu/h-ft$^2$-F. This corresponds to about an R3 thermal resistance. Both of these technologies require a significant number of manufacturing steps and expensive manufacturing equipment. Alternative methods, apparatus and manufactures for modifying energy transfer through windows, doors and other structures remains desirable.

SUMMARY

The disclosed subject matter relates to a composite structure, having: a first extrusion; a second extrusion disposed adjacent the first extrusion with a space there between; a cap extending between and joining the first extrusion and second extrusion and defining a three dimensional volume bounded by the first extrusion, the second extrusion and the cap, the cap being made from a material having a thermal conductivity less than that of the first extrusion and the second extrusion; and a foam fill at least partially filling the volume.

In another embodiment, the first extrusion and the second extrusion are parallel and have an aluminum alloy composition, the cap has a polymer composition and the foam has a polymer composition, the foam having a thermal conductivity less than that of the first extrusion and the second extrusion, the foam adhering to the first extrusion and the second extrusion.

In another embodiment, the first extrusion and the second extrusion each have an open channel extending along a length thereof and the cap has a web with a spaced pair of insertion legs extending along opposing edges thereof, a first of the pair of insertion legs inserting into the channel of the first extrusion and a second of the pair of insertion legs inserting into the channel of the second extrusion.

In another embodiment, the composite structure defines a U-shape, with the bottom of the U defined by the web, a first side of the U-shape defined by the first extrusion and a second side of the U-shape defined by the second extrusion, an area between the first side, the second side and the bottom of the U-shape being a cross-section of the volume receiving the foam fill.

In another embodiment, the channels have extensions along a length thereof, the foam mechanically keying to the extensions.

In another embodiment, the extensions are knurled.

In another embodiment, each of the channels have teeth retaining the insertion legs that are inserted therein.

In another embodiment, the insertion legs have barbs retaining the insertion legs in the channels.

In another embodiment further including a pair of end caps bridging the first extrusion, the second extrusion and the cap perpendicularly thereto, a first end cap applied to one end of the first extrusion, the second extrusion and the cap and a second end cap applied to a second end of the first extrusion, the second extrusion and the cap; a second cap, the second cap having a web and insertion legs, the channel of each of the first extrusion and the second extrusion being a first channel and each of the first extrusion and the second extrusion having a second open channel facing in a direction opposite to the first channel, insertion legs of the second cap being received in corresponding ones of the second channels, the second cap at least partially covering the foam fill.

In another embodiment, the foam fill is expanding foam and wherein the foam fill contacts the web of the second cap.

In another embodiment, the foam fill displaces the web of at least one of the first cap and the second cap to a displaced configuration.

In another embodiment, the displaced configuration is flatter than a relaxed state from which the web was displaced by the foam.`

In another embodiment, the web of at least one of the first cap and the second cap has a varying thickness, with the thickness increasing from the edges of the web to the center.

In another embodiment, the web of at least one of the first cap and the second cap has a double wall with a top wall and a bottom wall and at least one intermediate wall running between the top wall and the bottom wall.

In another embodiment, the web of at least one of the first cap and the second cap has a fin extending therefrom in a direction distal to the foam fill.

In another embodiment, a method for forming composite structures, includes the steps of: providing a first extrusion and a second extrusion, each having at least one open channel extending along a length thereof; providing a cap having a pair of spaced insertion walls extending along edges of a web thereof; assembling the cap to the first extrusion and the second extrusion with the spaced insertion walls inserting into the open channels of the first and second extrusions and the web bridging between the extrusions, the elongated cap holding the extrusions in spaced relationship defining a volume with a U-shaped cross-section, the cap forming the bottom of the U-shape and the extrusions forming the sides of the U-shape; providing a pair of end caps bridging the first extrusion, the second extrusion and the elongated cap in a direction perpendicular thereto; applying a first end cap to one end of the first extrusion, the second extrusion and the elongated cap; applying a second end cap to a second end of the first extrusion, the second extrusion and the elongated cap; depositing a flowable foam into the volume, the foam spreading over the cap and extending between the first and second extrusions; and allowing the foam to cure to a solid state.

In another embodiment, the structure has a second cap with a web and a pair of spaced insertion legs and the first and second extrusions each have a second open channel and further including the steps of: assembling the second cap to the structure by inserting the insertion legs thereof into the second channels of the first and second extrusions, the second cap covering the foam in the volume.

In another embodiment, the step of assembling the second cap is conducted after the step of depositing, the foam being an expandable foam, further comprising the step of allowing the foam to expand after the step of assembling, wherein the step of depositing deposits an amount of foam that expands beyond the volume as delimited by the volume, the second cap and the pair of end caps, the second cap having a length that is less than the length of the first and second extrusions and the first cap between the pair of end caps, defining a vent between an end of the second cap and at least one of the pair of end caps and further comprising the step of venting the foam through the vent.

In another embodiment, further including the step of trimming the structure to remove the vented foam.

In another embodiment, the foam is an expandable foam, further comprising the step of allowing the foam to expand after the step of assembling, wherein the step of depositing deposits an amount of foam that expands beyond the volume as delimited by the volume, the second cap and the pair of end caps, further comprising the step of trimming an upper surface of the foam to a predetermined level after the steps of allowing the foam to expand and curing and before the step of assembling the second cap to the structure, the predetermined level permitting the insertion legs of the second elongated cap to be fully inserted into the second channels of the first and second extrusions.

In another embodiment, a tool for aiding in the assembly of a of composite structure from a pair of extrusions, each extrusion having an internal hollow, has: a base and a pair of tines extending from the base, the tines having a tapered end facilitating the slidable insertion thereof into the internal hollows of the pair of extrusions, the tines capable of holding the extrusions at a predetermined relative spacing and orientation while joining the extrusions via the infusion of foam between the extrusions.

BRIEF DESCRIPTION OF THE DRAWINGS

For a more complete understanding of the present invention, reference is made to the following detailed description of exemplary embodiments considered in conjunction with the accompanying drawings.

DETAILED DESCRIPTION OF EXEMPLARY EMBODIMENTS

Figure 1:
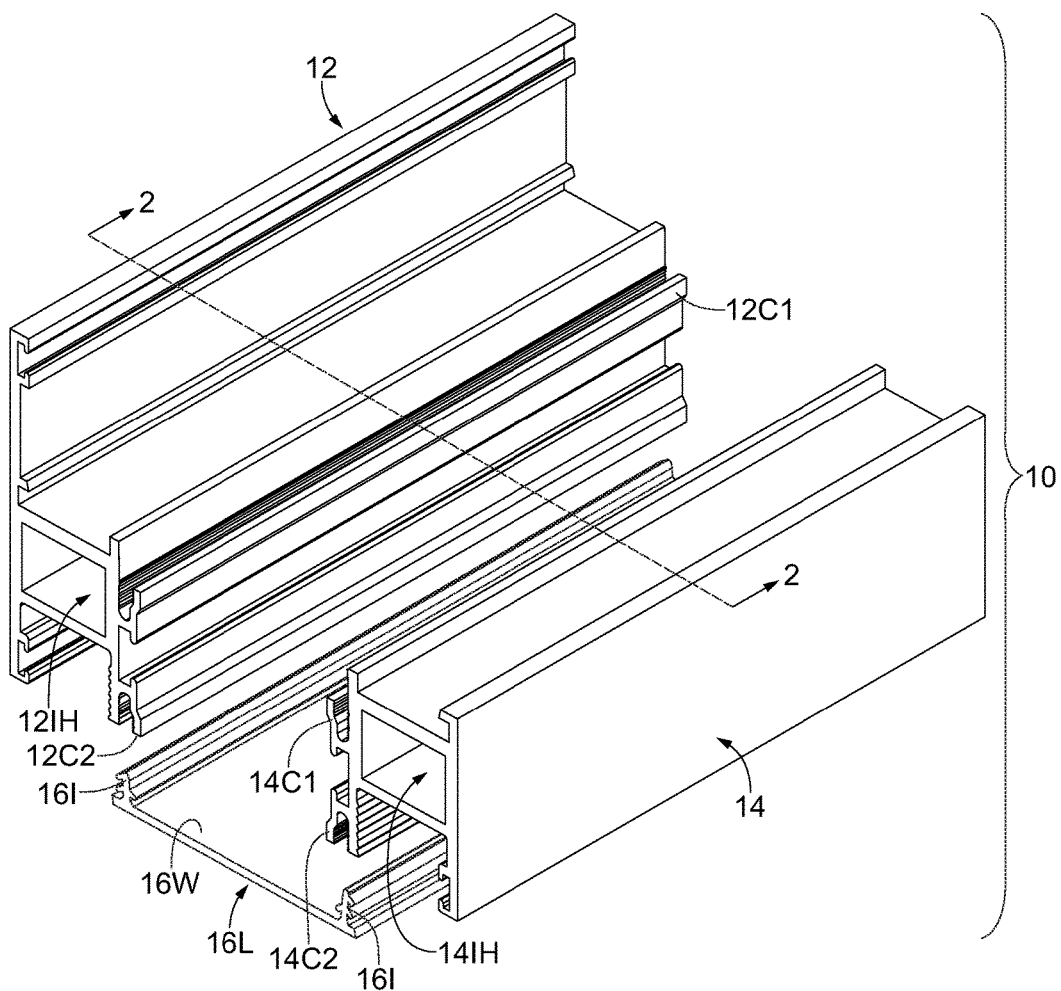
FIG. 1 is an exploded perspective view of a structural assembly in accordance with an embodiment of the present disclosure.
Figure 2:
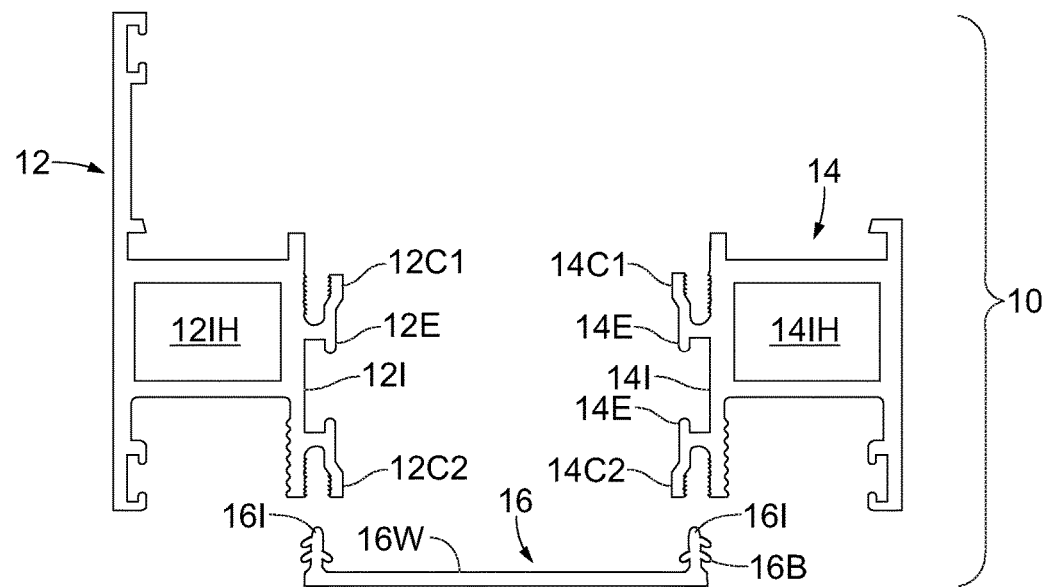
FIG. 2 is a cross-sectional view of the assembly of FIG. 1, taken along section line 2-2 and looking in the direction of the arrows.

FIGS. 1 and 2 show an assembly 10 having first and second extrusions 12, 14 that are bridged by a cap 16L. The extrusions 12, 14 may be made from a metal, such as an aluminum or steel alloy or a polymer, such as PVC or fiberglass and may be tubular, having internal hollows 121H and 141H. The cap 16L is made from a material, such as ABS or PVC, having a thermal conductivity that is preferably lower than the thermal conductivity of the extrusions 12, 14. The cap 16L has a web portion 16W and a pair of insertion legs 16I with burrs 16B. The insertion legs 16I are received in channels 12C2, 14C2 on the extrusions 12, 14. The extrusions 12, 14 may also feature upper channels 12C1, 14C1. The assembly 10 may be assembled together to form a composite structure 18, as shown in FIG. 4.

Figure 3:
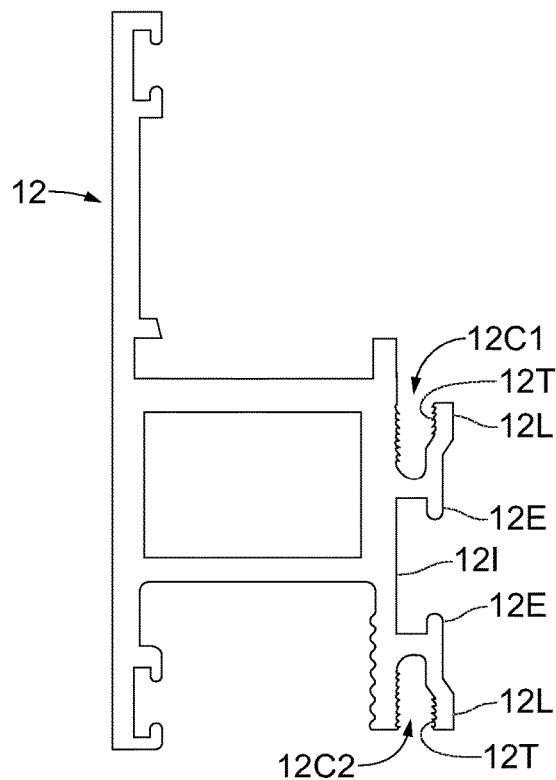
FIG. 3 is an enlarged view of a portion of the assembly of FIG. 2.

FIG. 3 shows that channels 12C1, 12C2 have locking teeth 12T in the interior thereof, an enlarged lead-in portion 12L and an extension 12E. The locking teeth 12T may be arranged to point into the channel 12C1, 12C2, promoting insertion of insertion legs 16I and burrs 16B and retention thereof in the channel 12C1, 12C2, resisting withdrawal. As shall be seen from FIG. 8, an upper cap 16U may be utilized, which interacts with channels 12C1, 14C1 in a manner similar to the way that lower cap 16L interacts with channels 12C2, 14C2. The extensions 12E may be knurled, i.e., roughened with a surface pattern of indentations, e.g., of a depth of 0.005-0.015 inch and a pitch of 0.030-0.040 inch to increase inter-digitation and interlocking between the knurled surface thereof and foam 24, (FIG. 7), increasing the strength at shear when the foam 24 is in a solid state and providing a higher shear strength for the composite structure 18 (FIG. 4). The channels 14C1 and 14C2 may also be provided with similar features as channels 12C2, 14C2, e.g., teeth 12T, lead-ins 12L and knurled extensions 12E.

Figure 4:
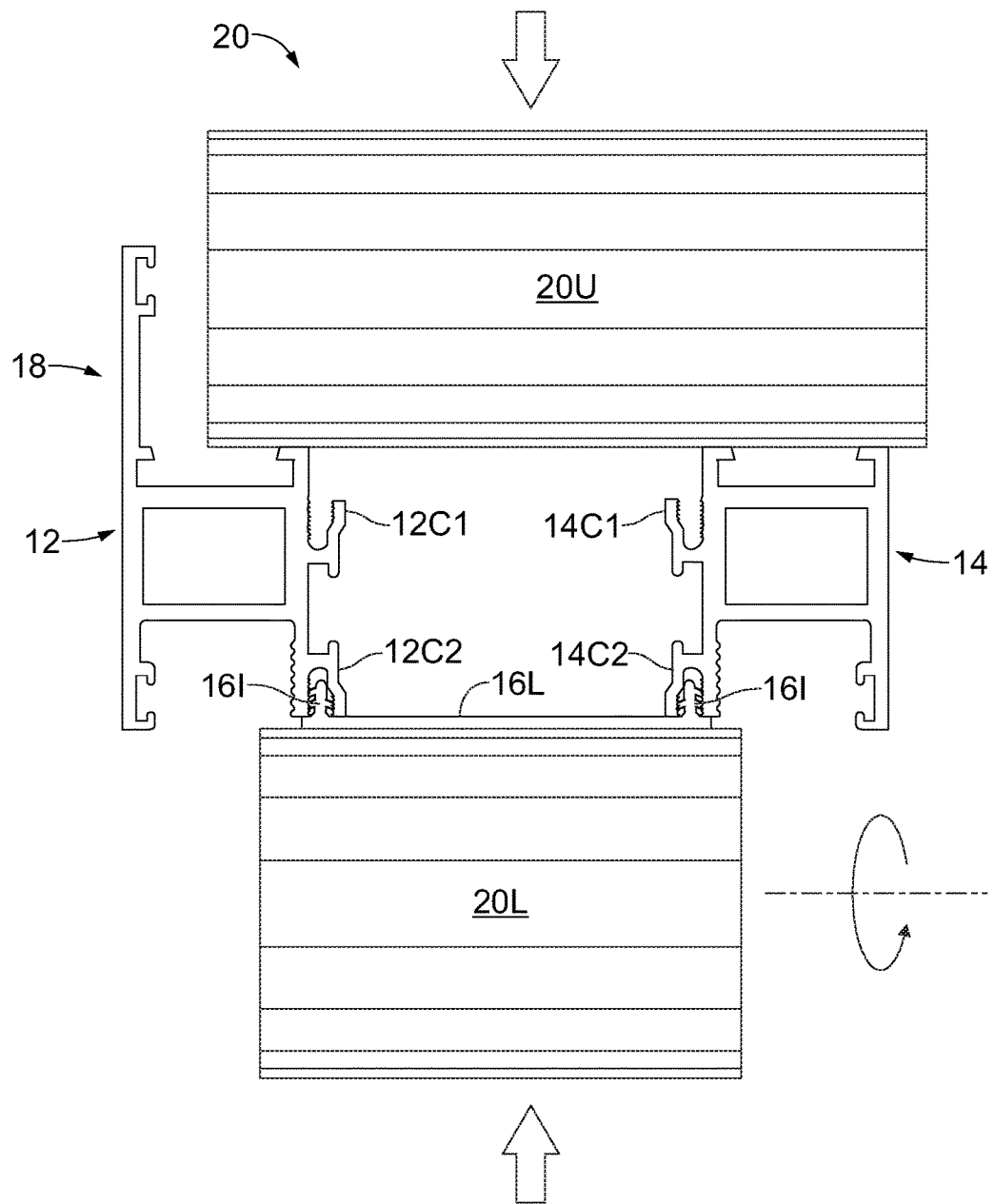
FIG. 4 is a diagrammatic view of an apparatus and method for assembling the assembly of FIGS. 1 and 2 into a composite structure.

FIG. 4 shows an apparatus 20 having upper and lower rollers 20U and 20 L that act upon the extrusions 12, 14 and the cap 16L for pressing the insertion legs 16I into mating channels 12C2, 14C2. Alternatively, the insertion legs 16I could be pushed home manually or using a tool, such as a rubber mallet or a press with opposed press plates that open and close, e.g., via a rack and pinion. The insertion of legs 16I may be started at one end and then the cap 16 and extrusions 12, 14 may be fed through the rollers 20L, 20U which are spaced apart a distance equal to the combined thickness of the cap 16 and extrusions 12, 14 when the insertion legs 16I are fully home in the channels 12C2, 14C2. Once this occurs at one end of the assembled cap 16 and extrusions 12, 14, forming the composite structure 18, the cap 16 and extrusions 12, 14 can be urged through the rollers 20L, 20U to gradually press the insertion legs 16I into the channels 12C2, 14C2 along the entire length of the extrusions 12, 14. Alternatively, the rollers 20L, 20U may be driven, e.g., by an electric motor (not shown), such that they pull the extrusions 12, 14 and cap 16 through the gap there between. In yet another alternative, the cap 16 and extrusions 12, 14 may be sequentially driven through a plurality of roller sets 20L, 20U that are positioned progressively closer together, with the last roller set occupying the relative spacing shown in FIG. 4 by 20L, 20U. In this manner, the cap 16 can be pressed home on the extrusions 12, 14 by the apparatus 20, starting from a position where the insertion legs 16I of the cap 16 are positioned adjacent the channels 12C2, 14C2 to a position where the insertion legs are pressed fully home into the channels 12C2, 14C2.

Figure 5:
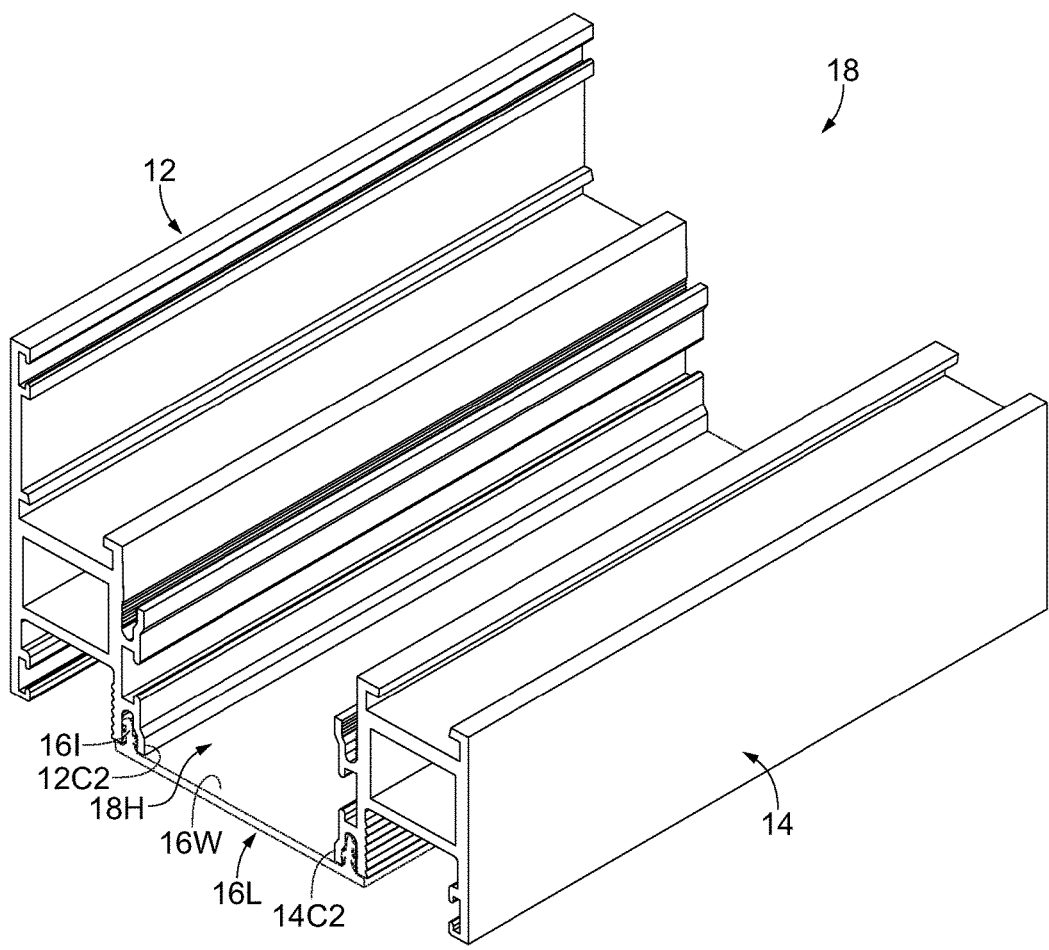
FIG. 5 is a perspective view of the composite structure of FIG. 4.

FIG. 5 shows an assembled composite structure 18 with a bottom cap 16L installed. The composite structure 18 has a hollow 18H, which is generally U-shaped in cross-section. This is attributable to the insertion legs 16I being generally at right angles relative to the web 16W which, when the insertion legs 16I are pressed into the channels 12C2, 14C2, results in a composite structure 18 with a generally U-shaped cross-section.

Figure 6:
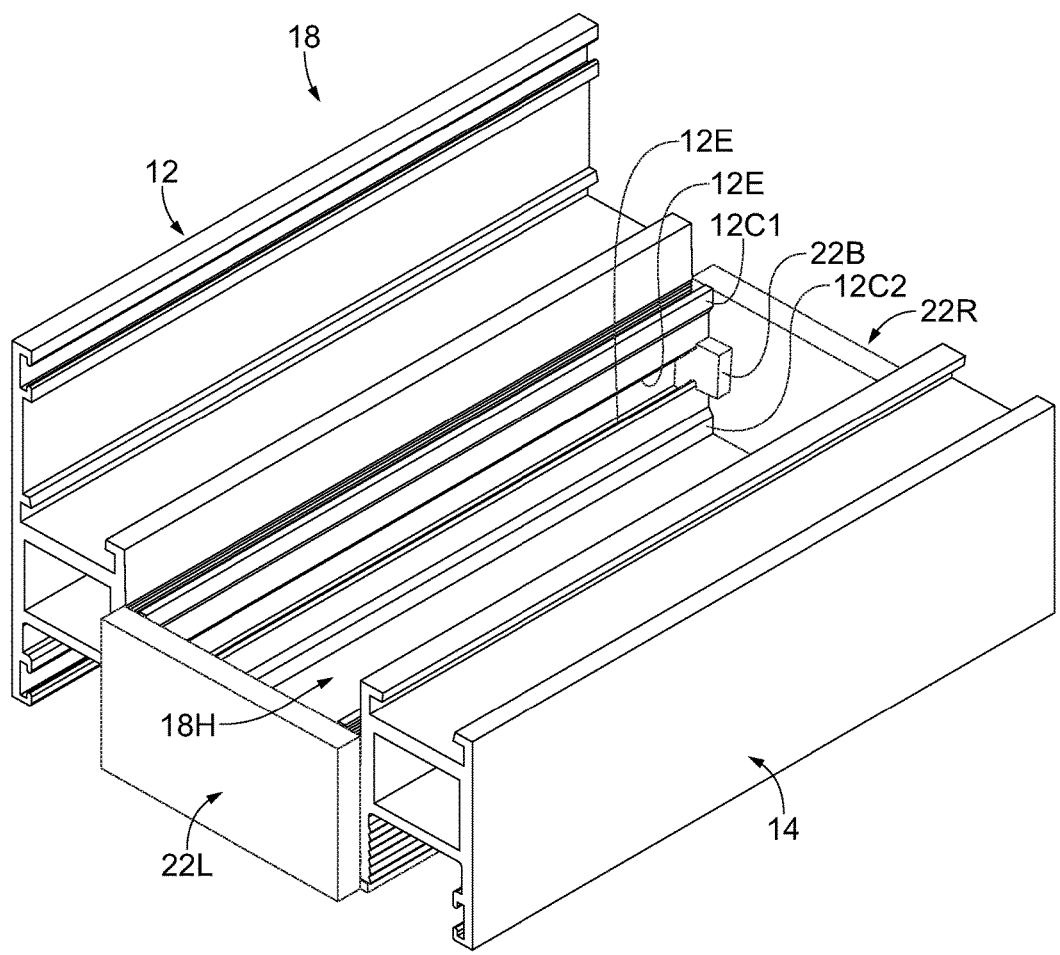
FIG. 6 is a perspective view of the structure of FIG. 5 with end caps installed.

FIG. 6 is a perspective view of the structure 18 of FIG. 5 with end caps 22L, 22R installed. The end caps may be made from a plastic, such as ABS or PVC, and have engagement blocks 22B that insert between and frictionally engage the upper and lower channels 12C1 and 12C2, e.g., fitting between the extensions 12E on the upper and lower channels 12C1 and 12C2. The end caps 22L, 22R may also be provided with prominences (not shown) that have a complementary shape to and that may be received in the channels 12C1 and 12C2 at the ends thereof, aiding in retaining the end caps in association with the composite structure 18. Adhesives and other mechanical interlocking mechanisms may also be employed to retain the end caps 22L, 22R on the structure 18.

Figure 7:
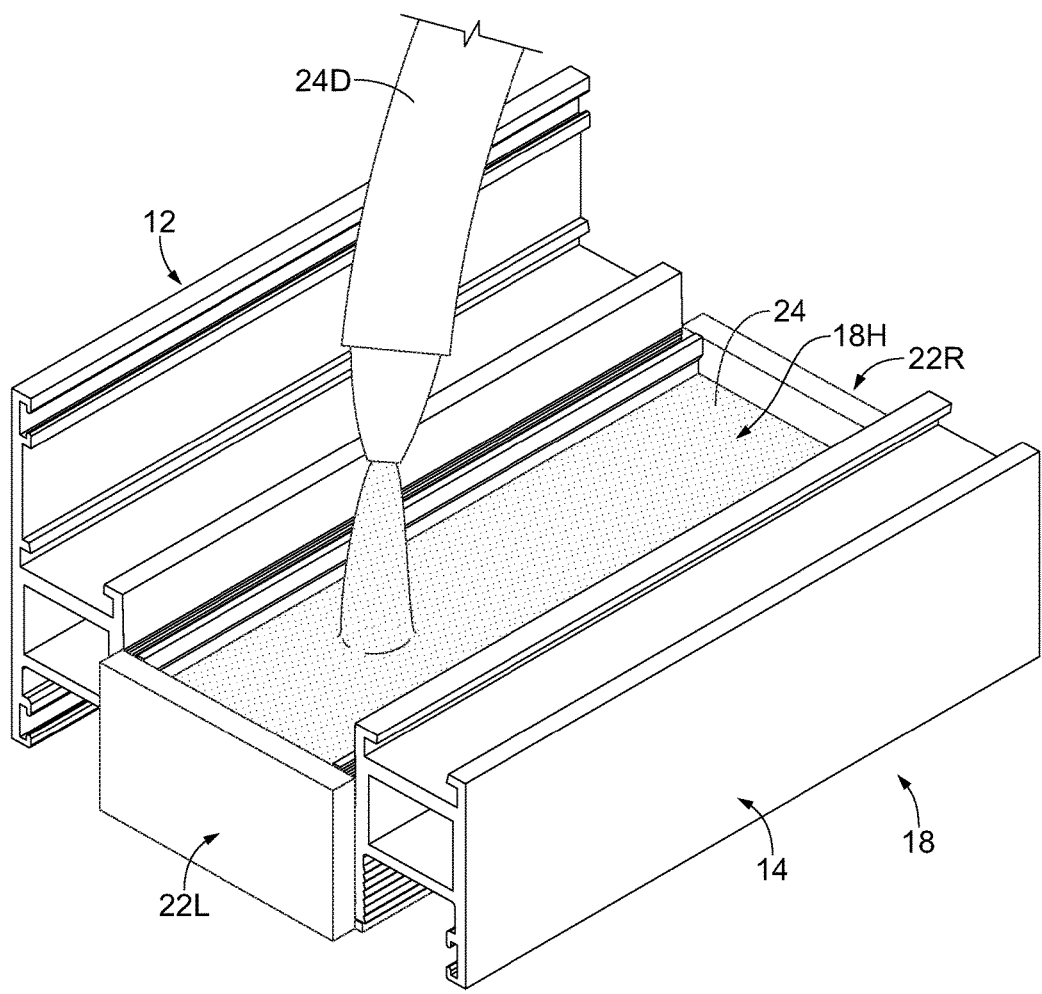
FIG. 7 is a diagrammatic view of method and apparatus for forming a foam thermal break in the structure of FIG. 6.

FIG. 7 shows a foam dispenser 24D dispensing a foam 24, such as polyurethane foam, into the hollow 18H of composite structure 18, between the end caps 22L, 22R. In one embodiment, the foam 24 does not expand substantially, such that the final level of the foam in the hollow 18D can be observed upon dispensing. In another embodiment, the foam 24 expands substantially, such that the final level in the hollow 18H is much higher than the initial level dispensed. In both instances, the foam is curable to a solid, e.g., upon exposure to the atmosphere or a curing agent and adheres strongly to the surfaces of the extrusions 12, 14 and the cap 16L with which it comes in contact while in the flowable state. In addition to the adhesion of the foam to the extrusions 12, 14 and the cap 16L, the foam also flows into and/or around and mechanically keys into features of the extrusions 12, 14, and the cap 16L that extend into the hollow 18H, such as the extensions 12E and knurling thereon, the mechanical interlocking becoming rigid upon the curing of the foam.

Figure 8:
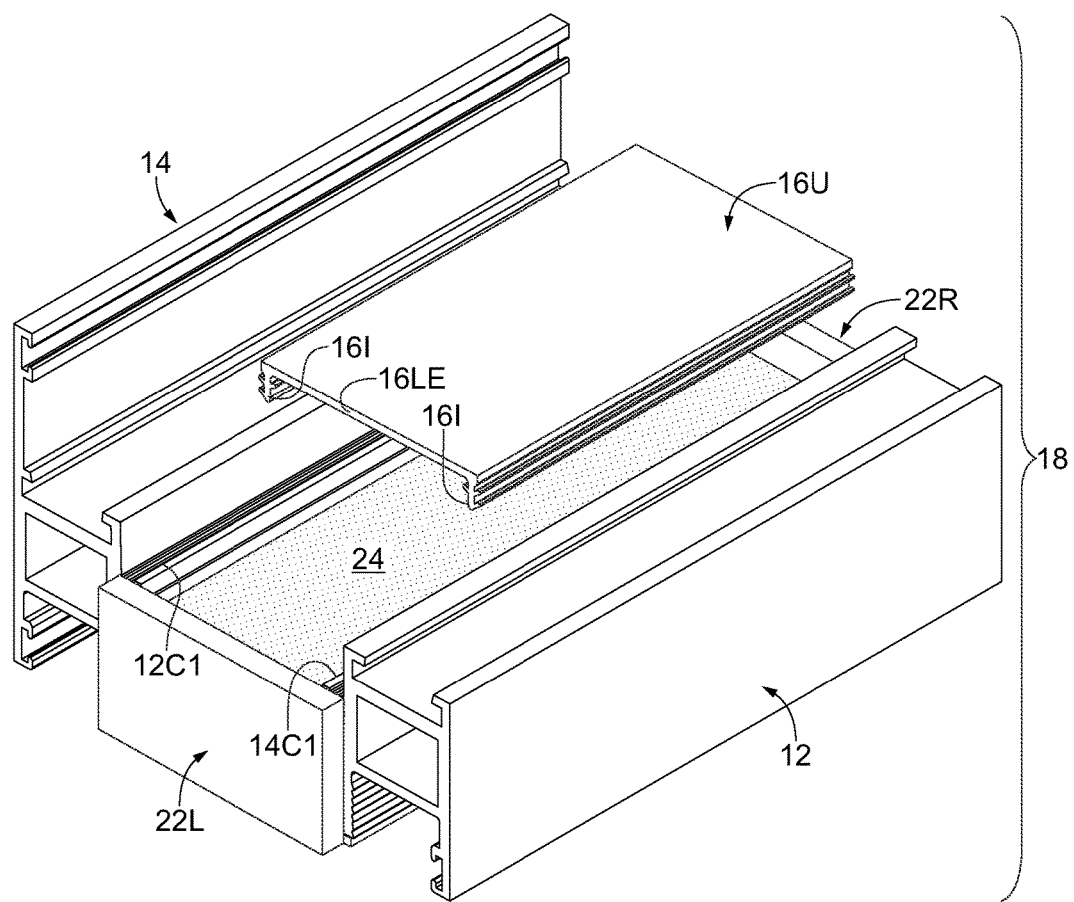
FIG. 8 is an exploded perspective view of the structure of FIG. 7 with a top cap.

FIG. 8 shows placement of upper cap 16U on the composite structure 18 after the foam 24 has been dispensed into the hollow 18H. The insertion legs 16I of the upper cap 16U are received in channels 12C1 and 12C2. This may be done after the foam 24 has expanded and/or cured, or prior to expansion of the foam 24, depending upon the amount of foam 24 dispensed and its expansion characteristics. The upper cap 16U may be utilized to cover the foam 24 to provide an aesthetically pleasing surface and/or as a means for shielding the foam from exposure to environmental elements, such as precipitation and solar radiation.

Figure 9:
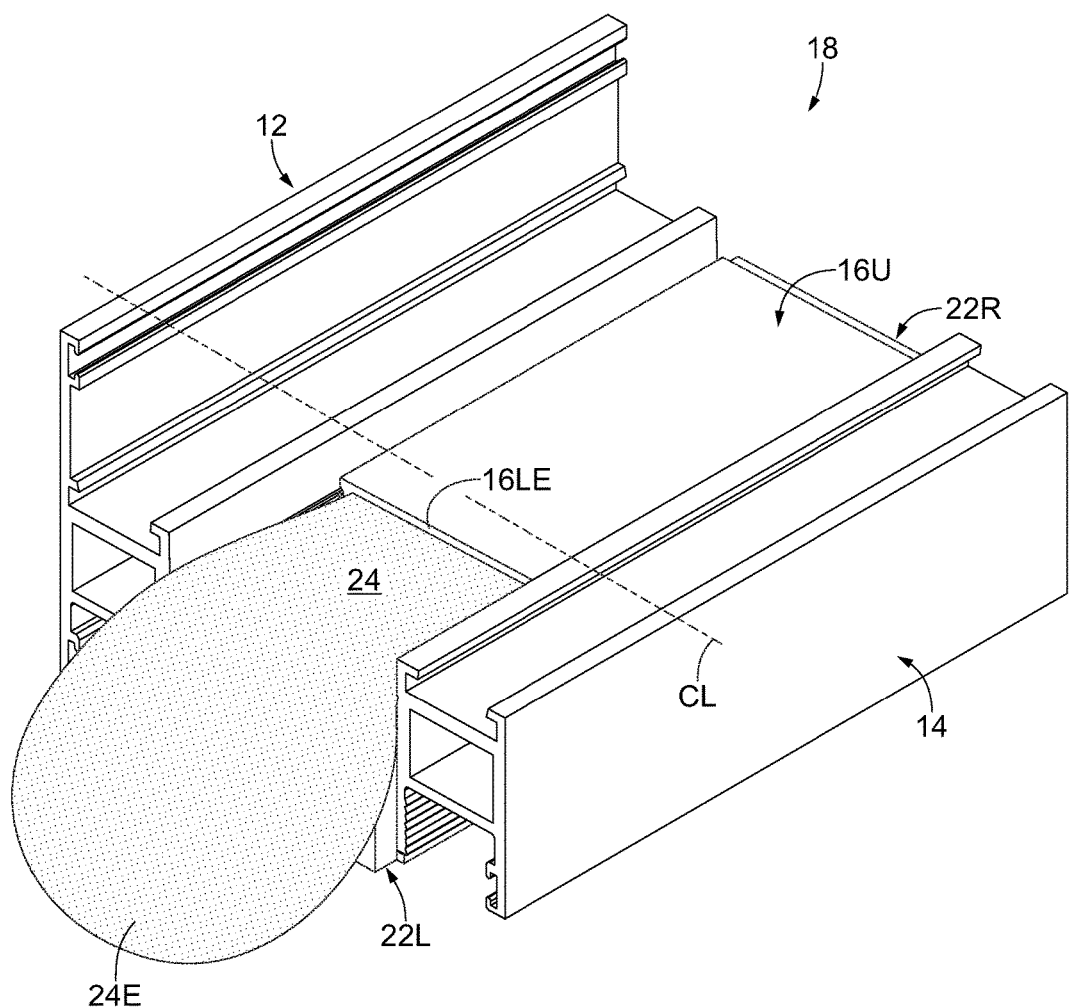
FIG. 9 is a perspective view of the structure of FIG. 8 with a foam overflow.

FIG. 9 shows an instance where the foam 24 is expandable and the upper cap 16U is assembled to the structure 18 prior to complete expansion of the foam 24, causing an overflow 24E as the foam 24 fully expands. The upper cap 16U may be truncated in length, such that it does not completely enclose the hollow 18H and provides a relief opening between an end of the upper cap 16U and an end cap 22L, permitting the foam to expand beyond the structure 18, forming overflow 24E.

Figure 10:
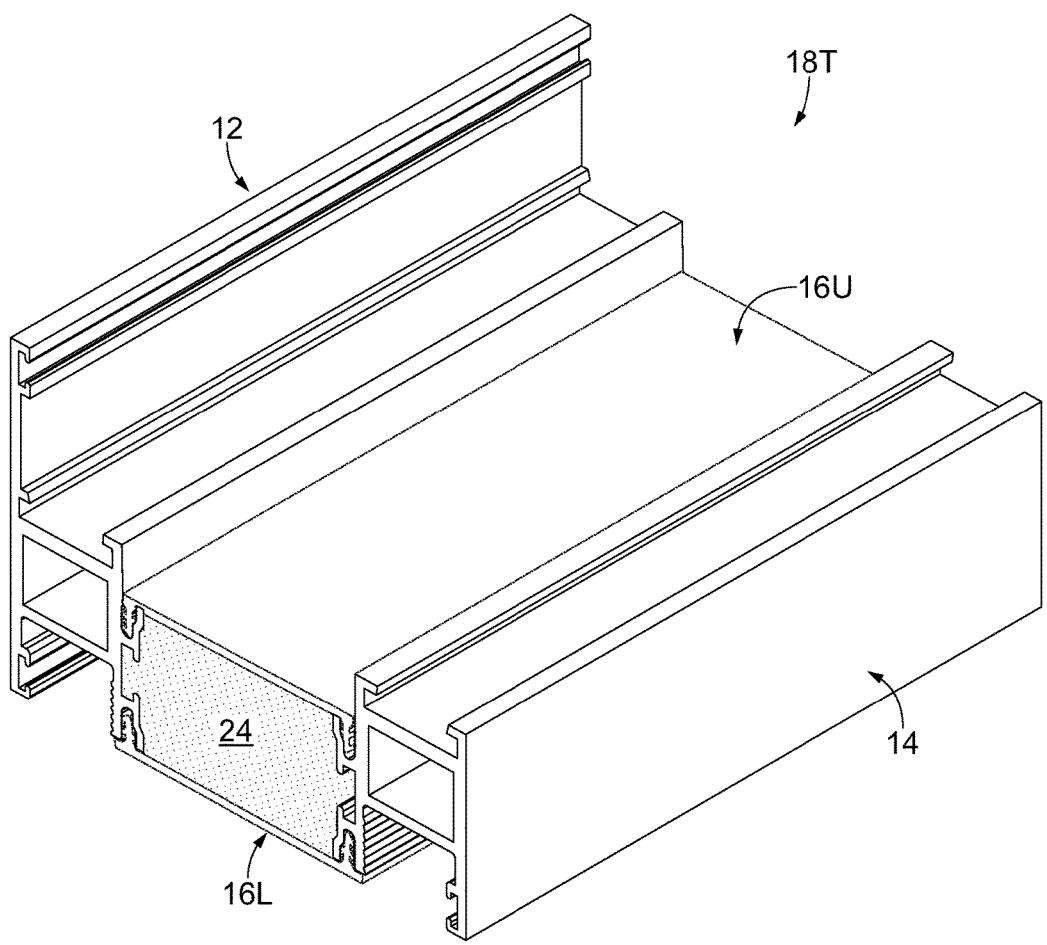
FIG. 10 is a perspective view of the structure of FIG. 9 after trimming.

As shown in FIG. 10, the composite structure 18 may then be sawn or ground off at dotted line CL (FIG. 9) to remove the overflow of foam 24E, resulting in a trimmed composite structure 18T.

Figure 11:
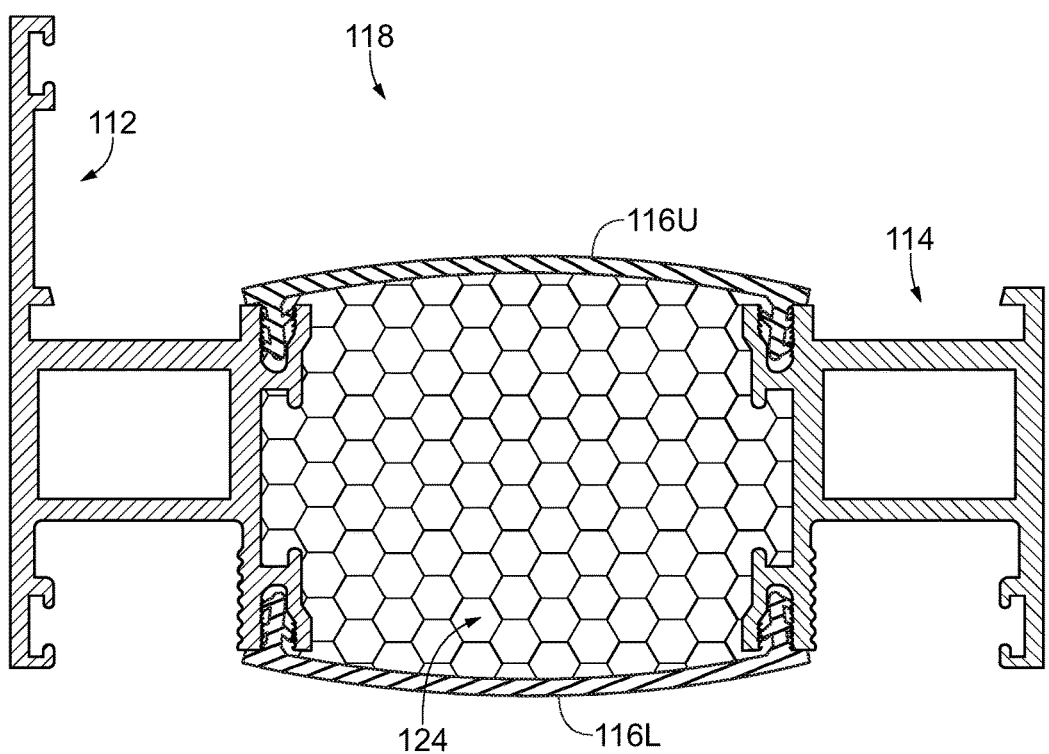
FIG. 11 is a cross-sectional view of a structure like that of FIG. 10 after foam expansion deforms upper and lower caps.

FIG. 11 shows a composite structure 118 utilizing upper and lower caps 116U, 116L and foam 124 that has expanded to the extent of bowing/bulging the caps 116U, 116L outwardly. This may be desirable to achieve a particular aesthetic effect and/or to achieve a surface shape that sheds precipitation or condensation. Alternatively, if bowing is not desired, the cap 116 may have increased thickness or be provided with features that reduce or eliminate bowing.

Figure 16:
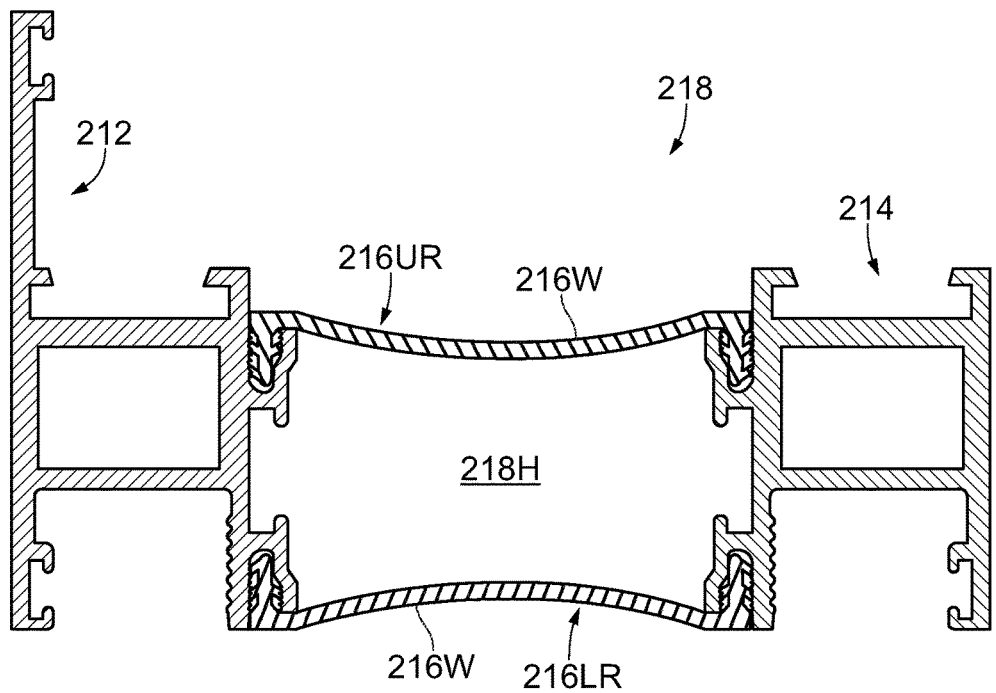
FIG. 16 is a cross-sectional view of a structure like that shown in FIG. 11 before foam expansion and having caps that have a convex initial shape.
Figure 17:
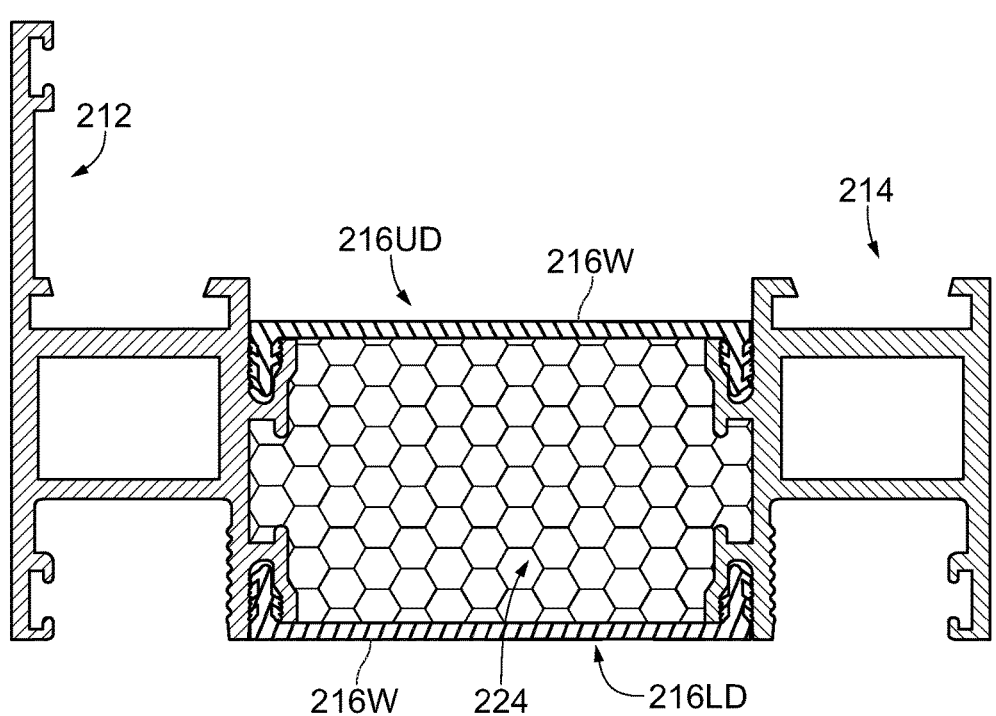
FIG. 17 is a cross-sectional view of the structure of FIG. 16 after foam expansion.

FIGS. 12 through 15 show caps 216, 316, 416, 516, respectively, that reduce bowing due to foam 24 expansion, providing a flatter post-expansion configuration. FIG. 16 shows an upper cap 216UR and lower cap 216LR having a web 216W that bows inwardly in its relaxed state, e.g., prior to being installed on a composite structure 218 and prior to the injection of foam 224 (FIG. 17) into hollow 218H. As shown in FIG. 17, after installation on structure 218 and after the hollow 218H thereof is filled with foam 224, which is allowed to expand, the foam 224 deforms the webs 216W of the upper and lower caps 216UR and 216LR in an outward direction from their relaxed configuration to their displaced configurations 216UD, 216LD, which are flatter, as shown in FIG. 17.

Figure 12:
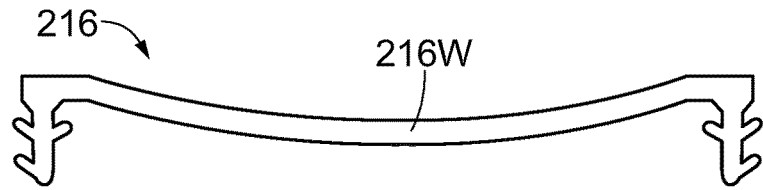
FIGS. 12-15 are side views of four different embodiments of caps in accordance with the present disclosure.
Figure 18:
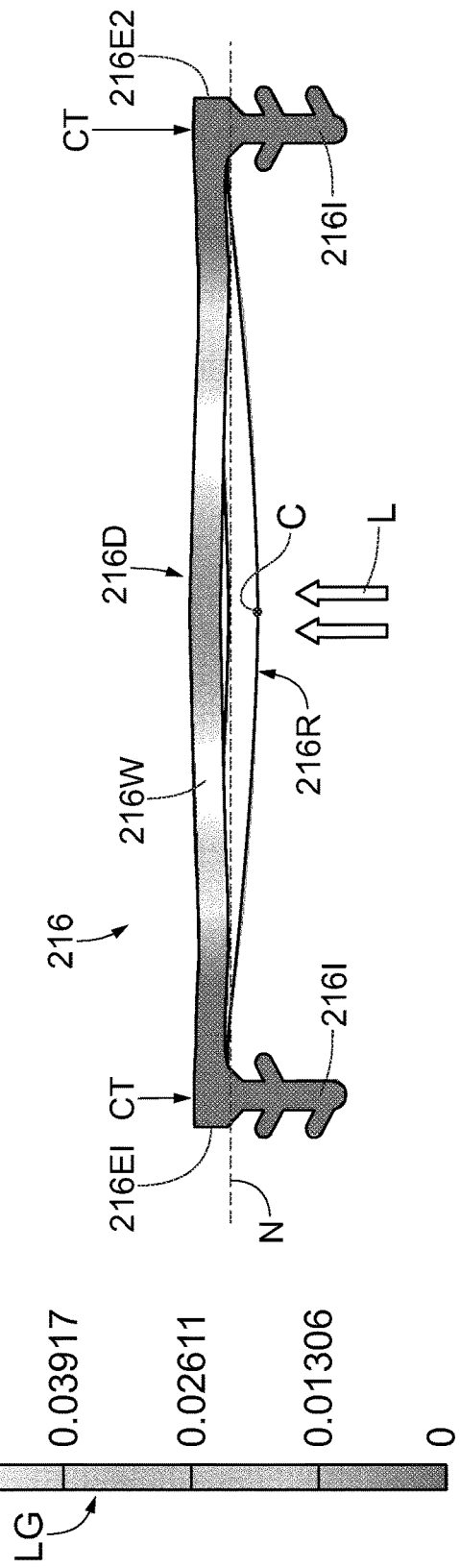
FIG. 18 is a screen shot of a finite element analysis conducted on a cap like that shown in FIG. 12.

FIG. 18 shows a finite element analysis (FEA) performed on cap 216 of FIG. 12, wherein the web 216 W is 0.050 inches thick, is made of PVC and curves inwardly 0.050 inches at the center C relative to a neutral line N. The neutral line N extends between the insertion legs 216I at their respective conjunctions with the web 216W. The fixed constraints CT for the analysis are applied proximate the side edges 216E1, 216E2 of the web 216W, in line with the insertion legs 216I. A uniform load L of 30 psi is exerted on the lower surface of the web 216W. The unloaded (relaxed) configuration 216R is shown and the loaded configuration 216D is superimposed there over and has shading representing displacement of the web 216W that is correlated to the legend LG. Under the indicated load, the web 216W is displaced 0.06528 inches at the center C, resulting is a web 216W that is almost flat in the displaced configuration 216D.

Figure 13:
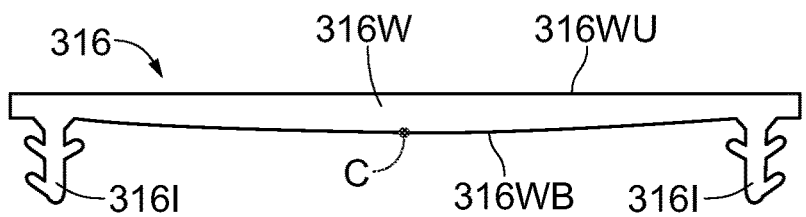
Figure 19:
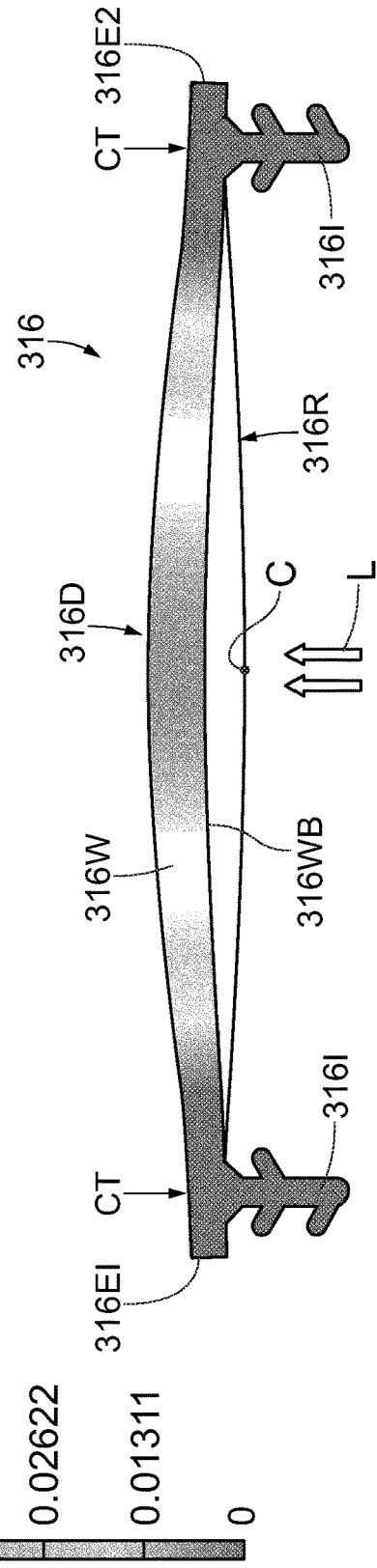
FIG. 19 is a screen shot of a finite element analysis conducted on a cap like that shown in FIG. 13.

FIG. 13 shows a cap 316 having a web 316W that is thicker at the center C than proximate the insertion legs 316I. The upper surface 316WU of the web 316W is flat in the relaxed state 316R, while the lower surface 316WB is curved, giving rise to a thicker center C. In one example, the web 316W varies in thickness from 0.058 inches proximate the insertion legs 316I to 0.090" thickness at the center C. FIG. 19 shows a finite element analysis of the cap 316 in PVC under a uniform load L of 30 psi on the lower surface 316WB of the web 316W with fixed constraints CT proximate the side edges 316E1, 316E2 of the web 316W, in line with the insertion legs 316I. Under these conditions, the web 316W displays a resultant vertical displacement of 0.06554 inches.

Figure 14:
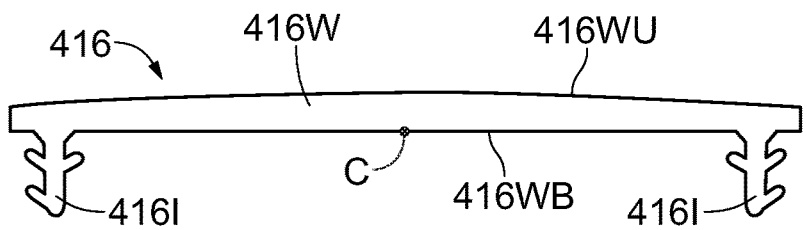
Figure 20:
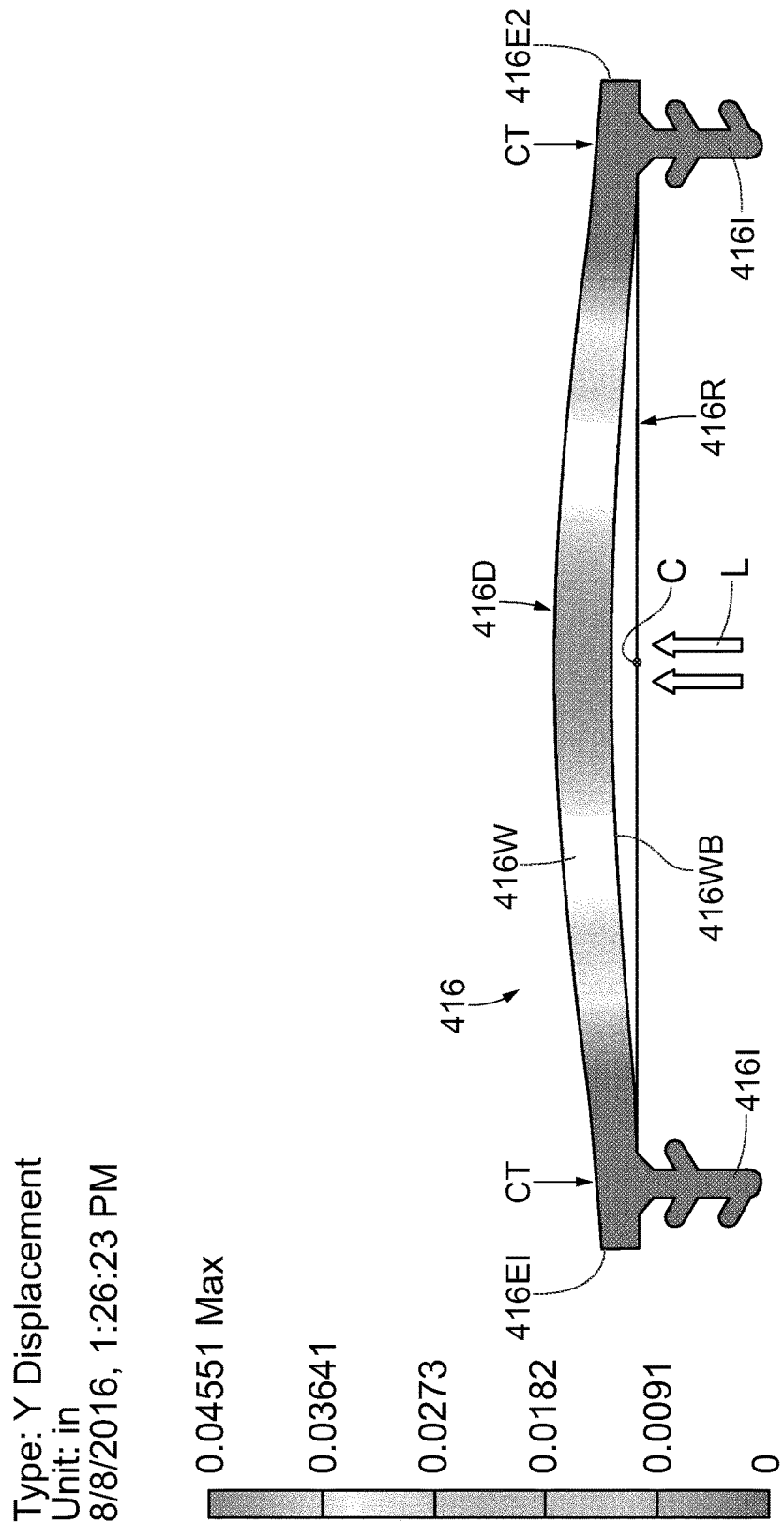
FIG. 20 is a screen shot of a finite element analysis conducted on a cap like that shown in FIG. 14.

FIG. 14 shows a cap 416 having a web 416W that is thicker at the center C than proximate the insertion legs 416I. The upper surface 416WU of the web 416W is arched, while the lower surface 416WB is flat in the relaxed state 416R, giving rise to the thicker center C. In one example, the web 416W varies in thickness from 0.058 inches proximate the insertion legs 416I to 0.090" thickness at the center. FIG. 20 shows a finite element analysis of the cap 416 in PVC under a uniform load L of 30 psi on the lower surface 416WB of the web 416W and with fixed constraints CT proximate the side edges 416E1, 416E2 of the web 416W, in line with the insertion legs 416I. Under these conditions, the web 416W displays a resultant vertical displacement of 0.04551 inches.

Figure 15:
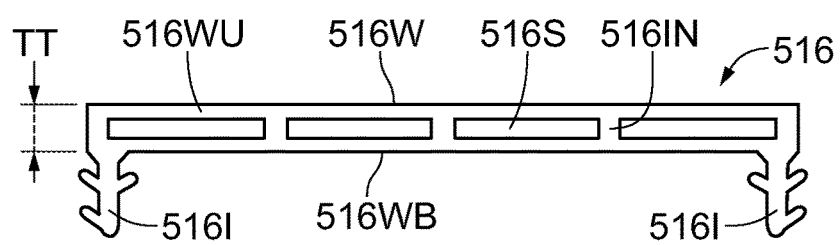
Figure 21:
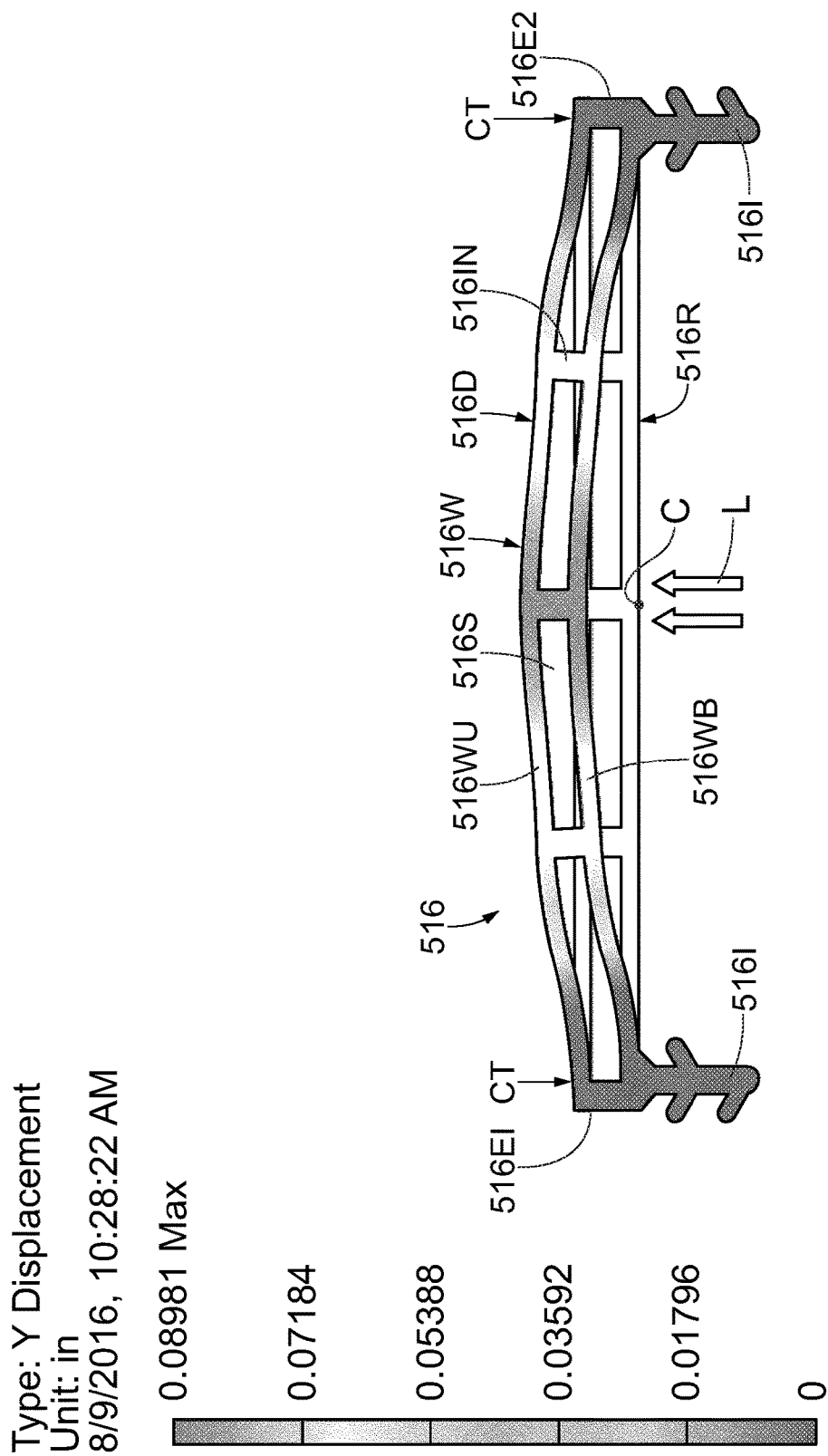
FIG. 21 is a screen shot of a finite element analysis conducted on a cap like that shown in FIG. 15.

FIG. 15 shows a cap 516 having a web 516W with a double wall, i.e., having upper wall 516WU and bottom wall 516WB, both of which are flat in the relaxed state 516R (FIG. 21) and with a space 516S there between. There are a plurality of intermediate walls 516IN extending between the upper and bottom walls 516WU and 516WB. In one example, the web 516W has a total thickness TT of 0.110 inches. FIG. 21 shows a finite element analysis of the cap 516 in PVC under a uniform load L of 30 psi on the lower wall 516WB of the web 516W and with fixed constraints CT proximate the side edges 516E1, 516E2 of the web 516W, in line with the insertion legs 516I. Under these conditions, the web 516W displays a resultant vertical displacement of 0.08981 inches.

Figure 22:
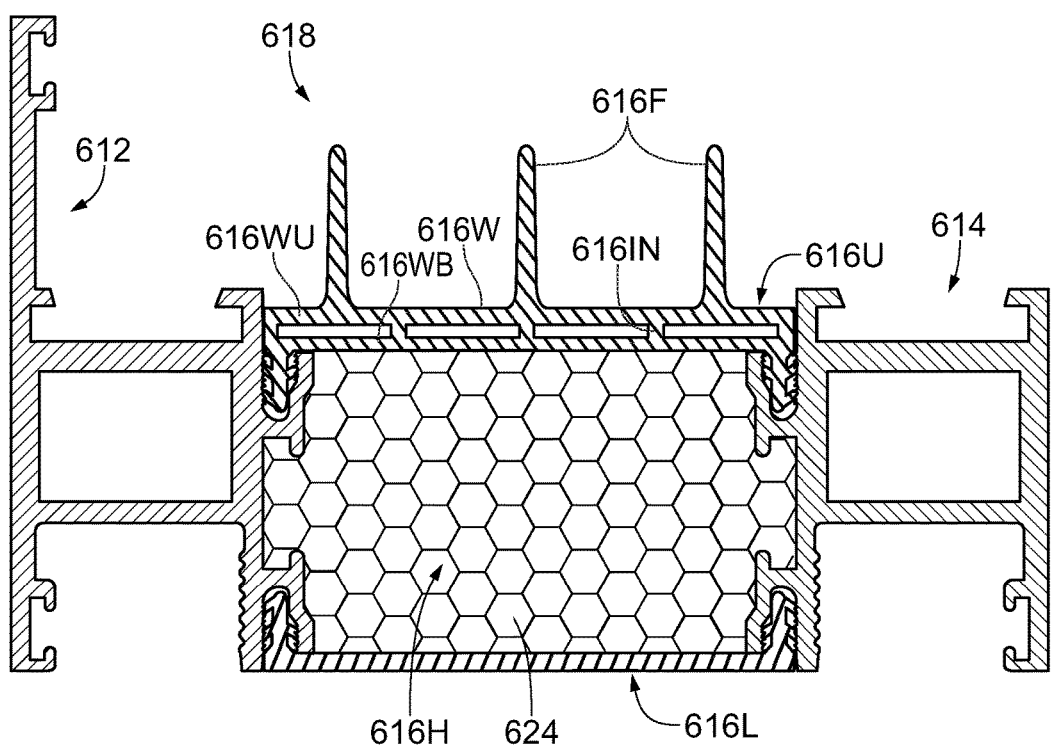
FIG. 22 is a cross-sectional view of a structure like that of FIG. 10 but with an upper cap in accordance with an alternative embodiment of the present disclosure.

FIG. 22 shows a composite structure 618 having extrusions 612 and 614 joined by a lower cap 616L and with a hollow 616H filled with foam 624. The upper cap 616U has a plurality of fins 616F extending upwards away from the foam 624. The web 616W has an upper wall 616WU, a lower wall 616WB and a plurality of intermediate walls 616IN. The fins 616F may be utilized to create a barrier to air circulation, e.g., as they extend toward or abut against the bottom of a window sash.

Figure 23:
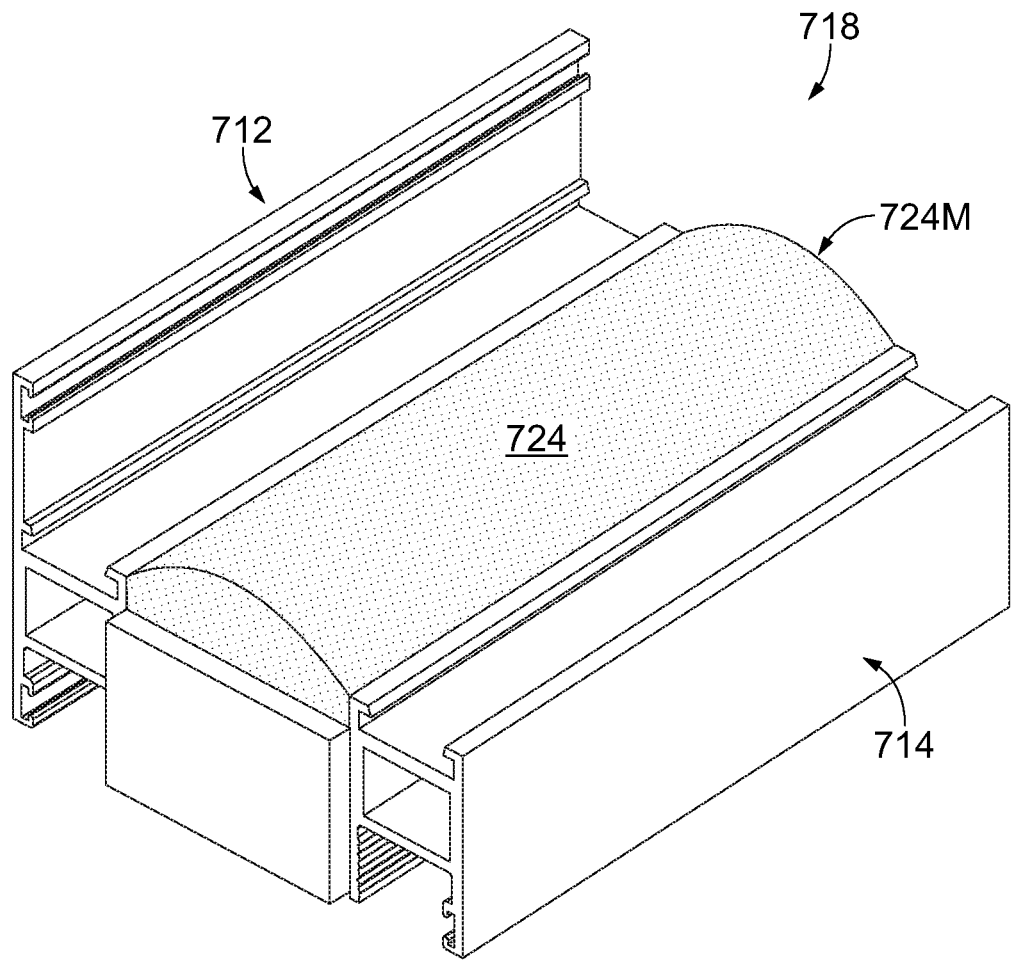
FIG. 23 is a perspective view of a structure like FIG. 7 after expansion of the foam and without an upper cap.
Figure 24:
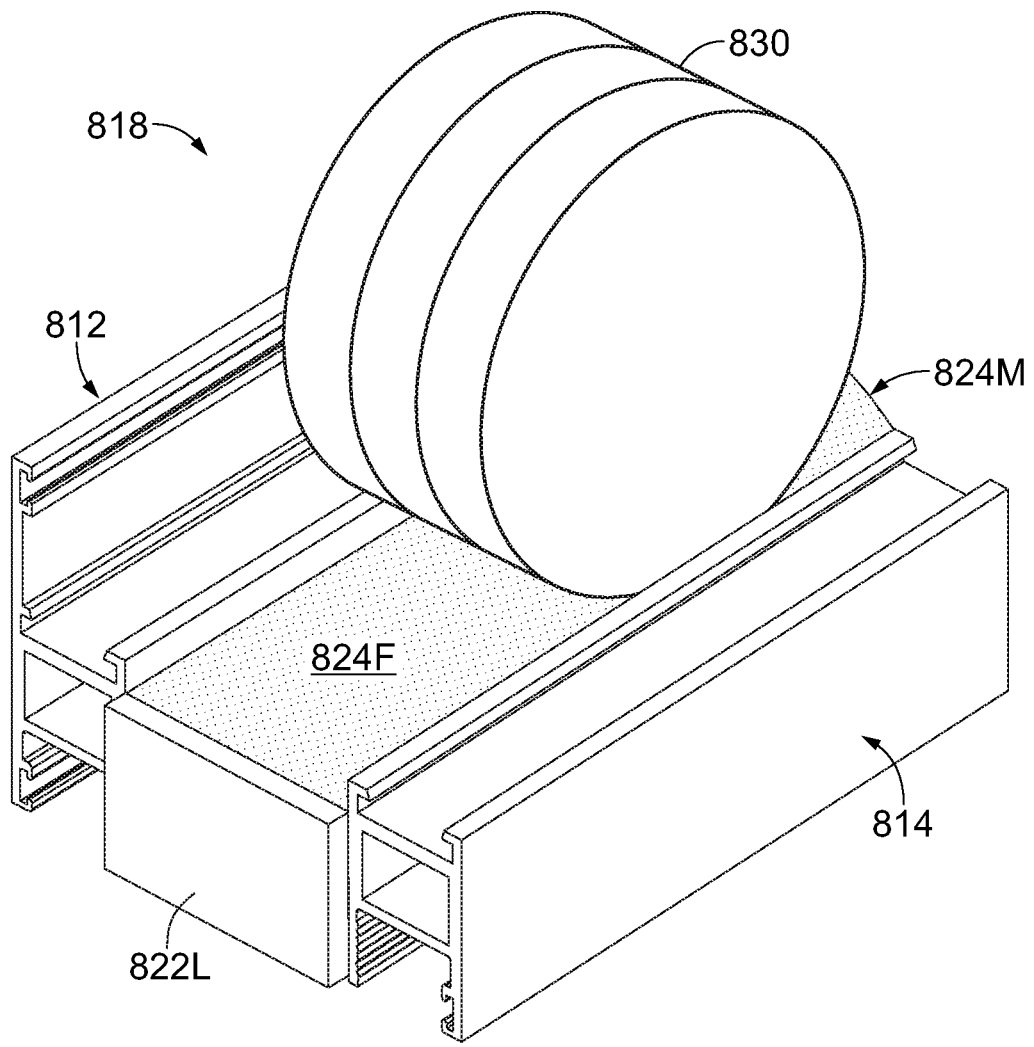
FIG. 24 is a diagrammatic view of an apparatus and method for cutting a portion of the expanded foam from the structure of FIG. 23 in accordance with an alternative embodiment of the present disclosure.
Figure 25:
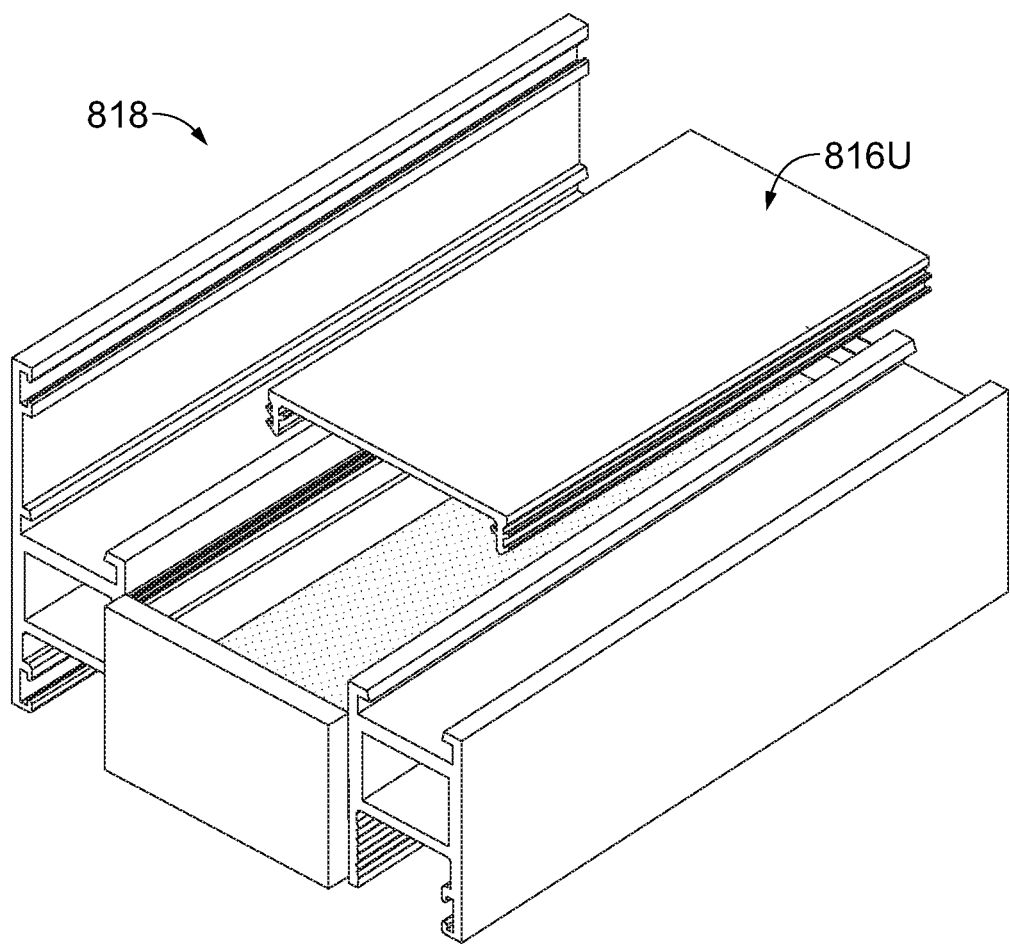
FIG. 25 is an exploded perspective view of the assembly of FIG. 24 after removal of a portion of the foam and showing an upper cap.

FIG. 23 shows a composite structure 718 utilizing extrusions 712, 714 joined by a lower cap (not shown) and with a hollow (not shown) filled with foam 724, similar to composite structures described above, e.g., 18 of FIG. 7. In FIG. 23, the foam 724 has expanded to form a crowned surface or mound 724M. The mound 724M may constitute a desired feature for the purposes of increased weather sealing or runoff. In the alternative, the mound 724 may not be desirable for aesthetic or functional reasons and in those instances, it may be desirable to flatten the mound 724M. FIG. 24 shows a cutter/grinder 830 removing a foam mound 824M, to leave a flat surface 824F on composite structure 818. FIG. 25 shows placement of an upper cap 816U on the structure 818 after removal of mound 824M. The removal of the mound 824M by the method shown in FIG. 24 and the placement of the upper cap 816U on the structure 818 avoids the removal of foam overflow 24E as in FIG. 9 and the subsequent step of trimming the structure 18 (FIG. 9) to yield the trimmed structure 18T (FIG. 10).

Figure 26:
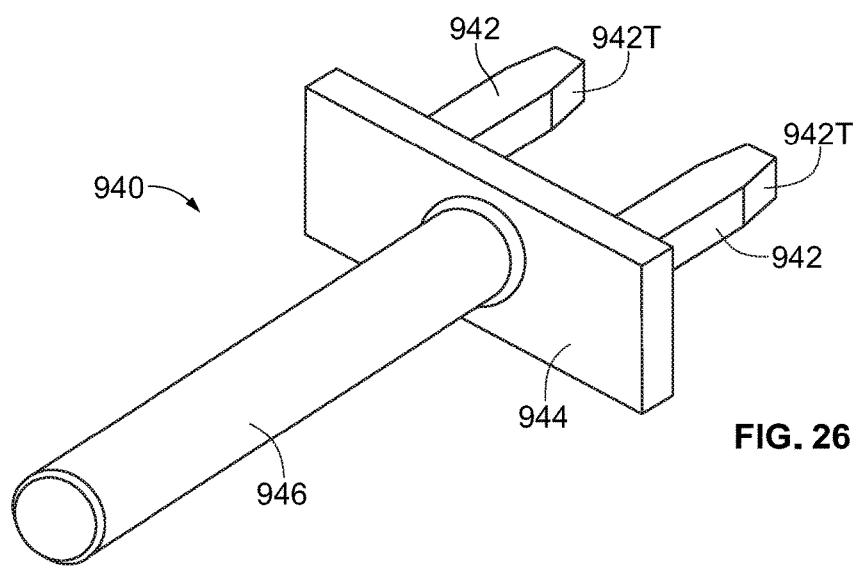
FIG. 26 is a perspective view of a holding tool for holding extrusions like those of FIG. 1 during manufacture of a structure in accordance with an alternative embodiment of the present disclosure.
Figure 27:
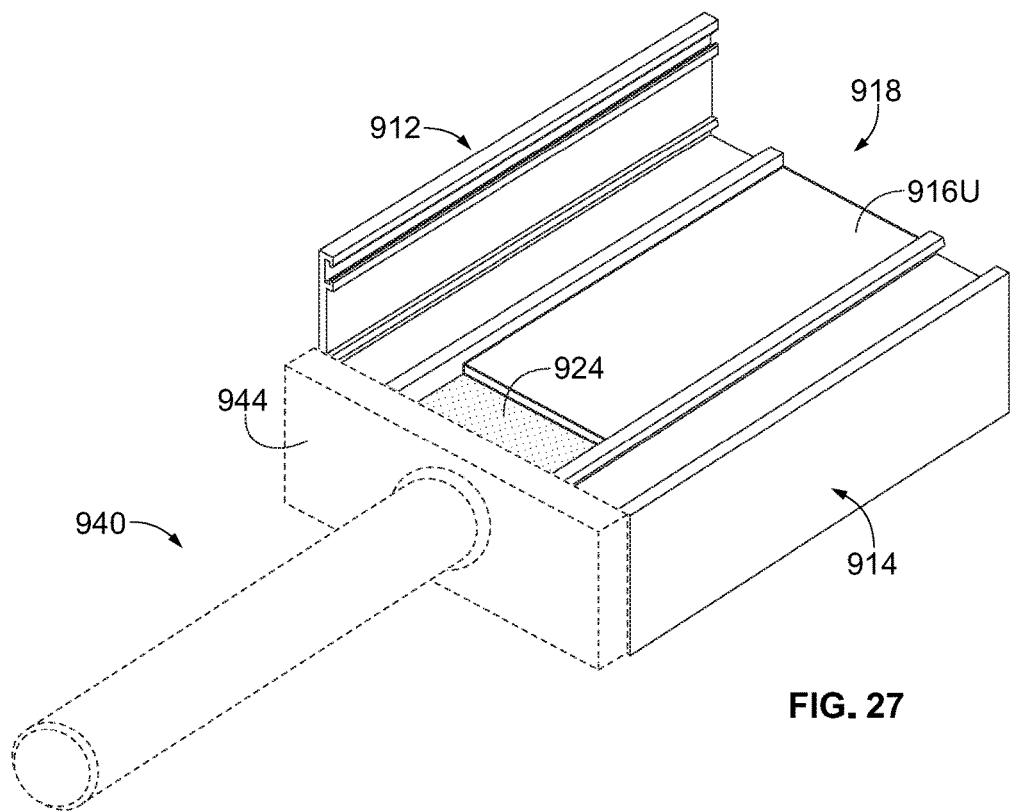
FIG. 27 is a perspective view of the tool of FIG. 26 holding a structure.

FIGS. 26 and 27 show a tool 940 holding adjacent extrusions 912, 914 relative to one another. The tool 940 has a pair of tines 942 each of which has a tapered end 942T. The tines 942 extend from a base 944 in a first direction and a torque arm 946 extends from the base 944 in a second direction. The torque arm 946 may be utilized manually or be inserted into a holding fixture (not shown).

FIG. 27 shows the tool 940 holding extrusions 912, 914 in proximity and in a generally parallel orientation. The tines 942 insert into internal hollows in the extrusions 912, 914 like hollows 121H, 141H of FIG. 1. The tines 942 may be dimensioned to establish a close fit in the extrusions 912, 914, enabling the tines 942 to slideably engage/disengage from the extrusions 912, 914 and firmly hold them in a predetermined position. The tool 940 may hold the extrusions 912, 914 during placement of the lower cap 16L (FIG. 1) and during injection and curing of foam 24, as in FIG. 7. The tool 940 may then be withdrawn, allowing the composite structure 918 to be further processed. The tool 940 may optionally remain in place during machining of the foam 924 and/or the placement of an upper cap 916U. The tool 940 may form a terminal boundary for the foam 924. When used to contact/shape the foam 924, the parts of the tool 940 exposed to the foam 924 may be coated on exposed surfaces with a non-stick coating, such as Teflon, to prevent sticking to the foam 924.

It will be understood that the embodiments described herein are merely exemplary and that a person skilled in the art may make many variations and modifications without departing from the spirit and scope of the claimed subject matter. For example, part 940 can be made out of aluminum or steel. All such variations and modifications are intended to be included within the scope of the disclosure.

We claim:

1. A composite structure, comprising:
a first extrusion;
a second extrusion disposed adjacent the first extrusion with a space there between, each of the first extrusion and the second extrusion having a channel;
a cap extending between and joining the first extrusion and the second extrusion and defining a three dimensional volume bounded by the first extrusion, the second extrusion and the cap, the cap being made from a material having a thermal conductivity less than that of the first extrusion and the second extrusion; and
a foam fill at least partially filling the volume,
wherein the cap has a pair of insertion legs extending from opposing sides of the cap, each of the pair of insertion legs extending in the same direction,
wherein each of the channels is parallel with one of the pair of insertion legs, and
wherein the channels open toward the cap such that each of the pair of insertion legs insert into one of the channels, the channels having extensions extending into the volume from a bottom surface of the channel distal to an opening of the channel, along a length of the channels, the extensions extending in a direction distal to an insertion leg inserted therein, the extensions extending into the foam and having indentations in a surface thereof within the volume, the foam interdigitating with the indentations.

2. The composite structure of claim 1, wherein the first extrusion and the second extrusion are parallel and have an aluminum alloy composition, the cap has a polymer composition and the foam has a polymer composition, the foam having a thermal conductivity less than that of the first extrusion and the second extrusion, the foam adhering to the first extrusion and the second extrusion.

3. The composite structure of claim 2, wherein the composite structure defines a U-shape, with a bottom of the U defined by a web of the cap extending between the pair of insertion legs, a first side of the U-shape defined by the first extrusion and a second side of the U-shape defined by the second extrusion, an area between the first side, the second side and the bottom of the U-shape being a cross-section of the volume receiving the foam fill.

4. The composite structure of claim 3, further comprising a pair of end caps bridging the first extrusion, the second extrusion and the cap and perpendicularly thereto, a first end cap of said pair of end caps applied to one end of the first extrusion, the second extrusion and the cap and a second end cap of said pair of endcaps applied to a second end of the first extrusion, the second extrusion and the cap.

5. The composite structure of claim 4, wherein the first and second extrusions each have a second channel and further comprising a second cap with a pair of spaced insertion legs inserted into the second channels of the first and second extrusions, the second cap covering the foam in the volume.

6. The composite structure of claim 3, wherein each of the channels have teeth retaining the insertion legs that are inserted therein and wherein the insertion legs have barbs retaining the insertion legs in the channels.

7. The composite structure of claim 3, further comprising a second cap, the second cap having a web and insertion legs, the channel of each of the first extrusion and the second extrusion being a first channel and each of the first extrusion and the second extrusion having a second open channel facing in a direction opposite to the first channel, insertion legs of the second cap being received in corresponding ones of the second channels, the second cap at least partially covering the foam fill.

8. The composite structure of claim 7, wherein the foam fill is expanding foam and wherein the foam fill contacts the web of the cap, the web of the second cap, the first end cap and the second end cap.

9. The composite structure of claim 8, wherein the foam fill displaces the web of at least one of the first cap and the second cap to a displaced configuration.

10. The composite structure of claim 9, wherein the displaced configuration is flatter than a relaxed state from which the web was displaced by the foam.

11. The composite structure of claim 8, wherein the web of at least one of the first cap and the second cap has a varying thickness, with the thickness increasing from the edges of the web to the center.

12. The composite structure of claim 8, wherein the web of at least one of the first cap and the second cap has a double wall with a top wall and a bottom wall and at least one intermediate wall running between the top wall and the bottom wall.

13. The composite structure of claim 8, wherein the web of at least one of the first cap and the second cap has a fin extending therefrom in a direction distal to the foam fill.

14. The composite structure of claim 1, wherein the indentations in the extensions are knurling indentations and the foam is expanding foam that expands into the indentations, the foam mechanically keying to the extensions when the foam is in a solid state.

15. The composite structure of claim 1, wherein the first and second extrusions each have a second channel with a second extension extending toward the first channel.

* * * * *